United States Patent Office 3,533,782
Patented Oct. 13, 1970

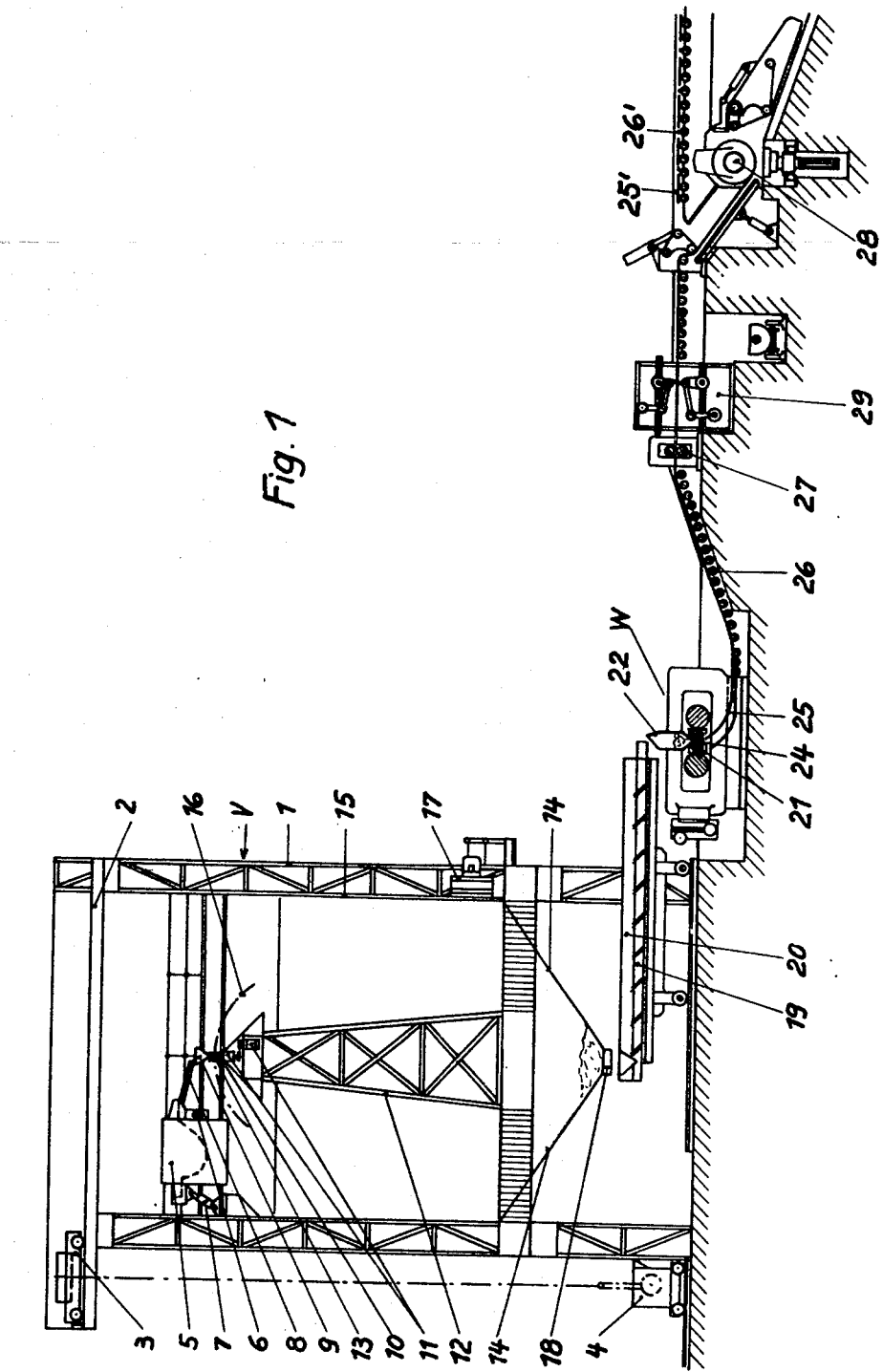

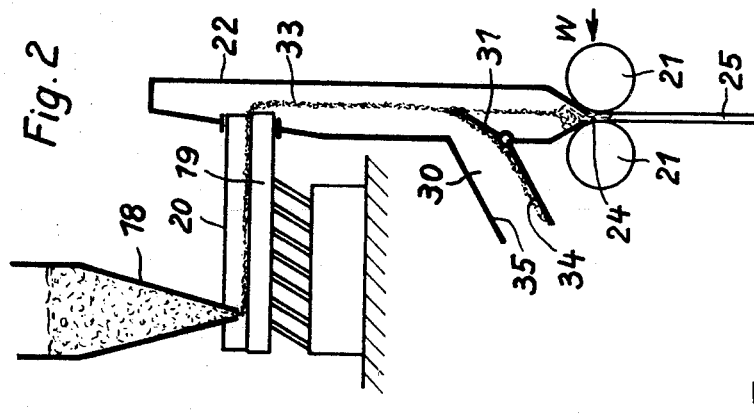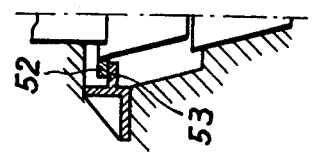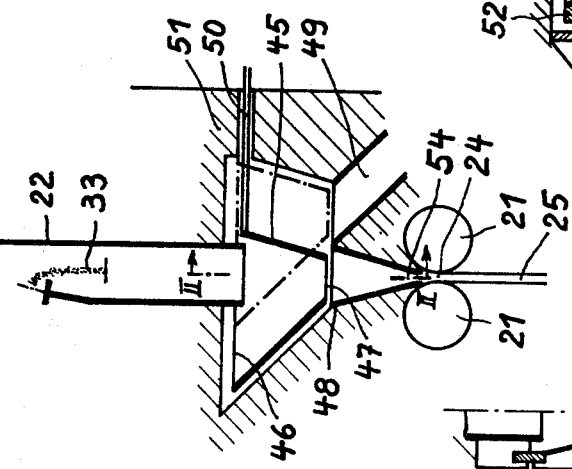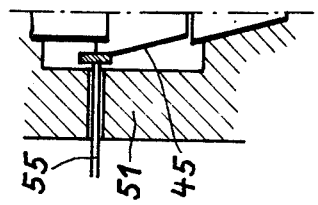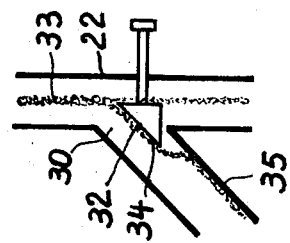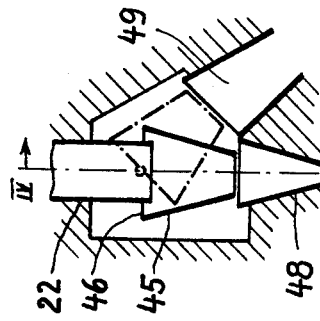

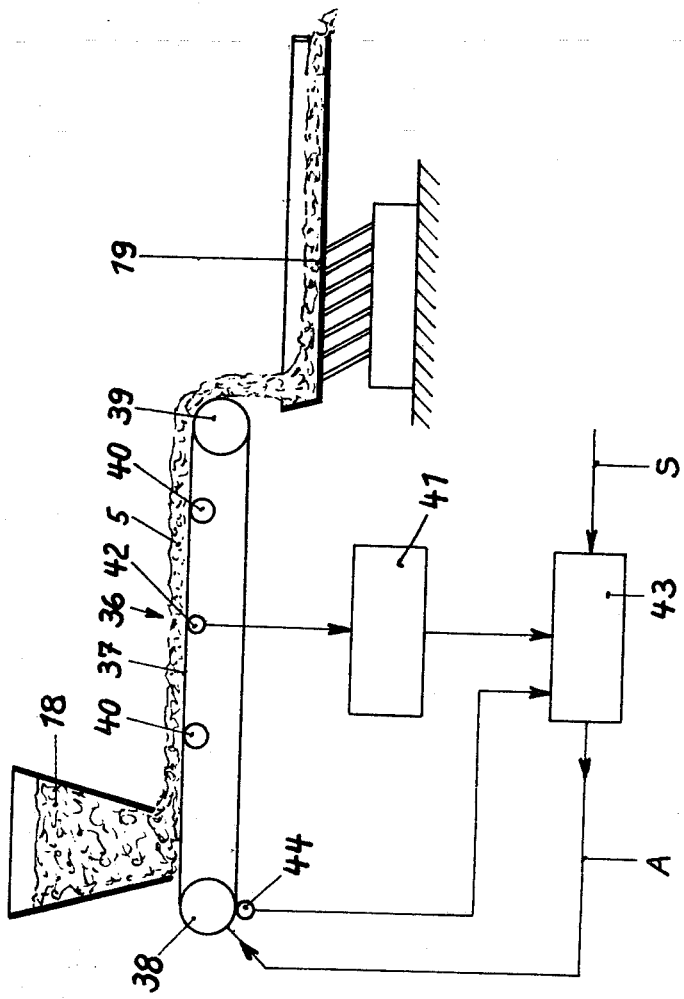

3,533,782
PRODUCTION OF SHAPED PIECES, STRIPS OR
SECTIONS FROM METAL PARTICLES
Kurt Claus, Metzkausen, and Eckard Gehring, Dusseldorf-Kaiserswerth, Germany, assignors to Schloemann Aktiengesellschaft, Dusseldorf, Germany, a German company
Filed Jan. 13, 1967, Ser. No. 609,043
Int. Cl. B22f 1/00
U.S. Cl. 75—213                                11 Claims

ABSTRACT OF THE DISCLOSURE

Method for the production of metal articles by converting molten metal into particles and sintering the particles into compact articles in one heat.

---

This invention relates to a method for the production of shaped pieces, strips or sections by sintering (uniting) hot metal particles.

From the weld-steel process it has become known to keep metal particles in stock, feed them to a furnace, and heat them therein to welding temperature, in which condition they are capable of being sintered into a compact product. This process, however, as is known, requires a comparatively great expenditure on equipment, and furthermore takes a great deal of time to carry out.

The object of the present invention is to shorten the time required for the preparation and heating in a process of the kind hereinbefore mentioned as well as, to simplify the equipment necessary for it, and at the same time to obtain a substantial lowering of the cost. This is substantially attained, according to the invention, by the fact that the metal particles, produced in a known manner from a melt, are sintered in one heat to form shaped pieces, strips or sections. This sintering is advantageously effected under pressure, for instance in a rolling mill. Owing to the fact the process for the production of the metal particles is combined with the process of treatment to the finished profile, not only are substantial savings possible in storage costs and in the time of preparation up to the uniting process, but in addition to this a material factor is also to be recognised in the fact that the heat of the metal particles is directly utilised for the further treatment thereof.

In a further development of the invention, therefore, the metal particles, in their production from the melt, are cooled down only so far that at their union they have the temperature requisite for this purpose. The cooling of the metal particles is advantageously carried out under control as by employing a cooling medium such as gas, the quantity and/or temperature of which can be regulated. In order as far as possible to prevent any oxidation of the metal particles during their production, the metal particles are preferably cooled with a protective or reducing gas.

In order that the height of fall of the metal particles may be restricted to a minimum, they may advantageously be allowed to fall freely from the melt only until their solidification, and preferably in a current of gas. Thereupon, if necessary, the temperature of the metal particles is equalised, this being effected before their sintering into a compact product.

The producing and the sintering of the metal particles may be effected either continuously or discontinuously. Advantageously, however, the production and the sintering of the metal particles are effected continuously in a line, the two processes being adjustably coupled together in such a way that either the quantity of particles produced per unit of time is adapted to the quantity to be united, or conversely. For the process it is however an advantage if the quantity of particles produced just about corresponds to the quantity of particles to be united, and an exact adaptation of the two processes to one another is then carried out by varying the quantity of particles to be sintered.

In the continuous method of working, particularly in the production of steel products, it is an advantage if the entire process, from the production of the metal particles from the melt through to the union thereof into compact products, is carried out in a protective atmosphere. Since any oxidation of the metal particles is thereby prevented, practically no reduction is required.

The sintering of the metal particles can be advantageously carried out by rolling or pressing. The metal particles may consist of aluminum or aluminium alloys, unalloyed or alloyed steel, copper or copper alloys, or even of other metals. The process advantageously permits the production of compact products or intermediate products, when pure products with especially good properties are to be produced.

The process is carried out with apparatus for the production of metal particles, in conjunction with a treatment machine that sinters the metal particles, the two constructional units being operatively connected with one another. The apparatus for the production of metal particles may advantageously be provided with a charging means, which is combined with a regulating appliance. On the apparatus for the production of the metal particles are arranged blowers for supplying the cooling air or cooling gases required for the cooling of the metal particles. The apparatus for the production of the metal particles may be arranged at a higher or a lower level than the treatment machine, or on the same level, according to the special requirements in operation, or other reasons that are decisive for the structure to be produced. Between the apparatus for the production of the metal particles and the treatment machine, a chamber may be provided for the equalisation of the temperature of the metal particles, i.e. subjecting the particles to a constant temperature so the core and peripheral zone of the particle are substantially the same temperature, and this chamber may advantageously consist of heatable transporting means. The parts of the plant are preferably enclosed as well as the connections to the other parts of the plant, such that no disturbing gases, particularly oxidising gases, con penetrate from the exterior. The apparatus for the production of the metal particles consists advantageously of a centrifuge, known in itself, or of a spraying device.

The invention is further explained with reference to the accompanying drawings, relating to constructional examples, in which:

FIG. 1 is a sketch illustrating the principle of the plant as a whole;

FIG. 2 shows a modified form of construction, with a by-pass device for the flow of particles;

FIG. 3 shows a form of construction with a regulating band weighing means;

FIG. 4 shows a modification of the by-pass device of FIG. 2;

FIG. 5 shows a form of construction provided with a deflecting funnel;

FIG. 6 shows the left half of a section on the line II—II in FIG. 5;

FIG. 7 shows another form of construction of the deflecting funnel of FIG. 5; and FIG. 8 shows the left half of a section on the line IV—IV in FIG. 7.

FIG. 1 is a diagrammatic sketch of a plant particularly designed for the production of aluminium strips from metal particles. In this diagrammatic sketch, V denotes the apparatus for the production of the metal particles, and W a rolling mill that follows it. A tower 1 is provided above with track rails 2 for a travelling crane 3. The travelling crane serves for lifting a transfer ladle 4, by which a tiltable heat-maintaining stove 5, with melt, aluminium in the present case, is charged. The tilting of the heat-maintaining stove 5 about its tilting axis 6 is effected by means of the hydraulic cylinder 7. Over a channel 8 the molten metal is supplied, by way of a funnel 9, to a centrifuge 10. The centrifuge 10, with its driving elements 11, is secured upon a bracket 12. Upon rotation of the perforated centrifuge drum 13, the drops of metal issuing from the perforations fall in the direction of a conically tapering floor 14 of a lining or casing 15 of the tower 1. The line of fall of the issuing drops is marked 16. On the way from the centrifuge to the bottom 14 of the casing 15, the heat of fusion is withdrawn from the particles, which at first are still liquid. By fans 17 arranged at the periphery of the tower, air is blown into the tower, and this air determines the cooling rate of the metal particles.

In the production of rolled products from aluminum particles it is immaterial whether the particles are coated with a film of oxide. In the present example, therefore, instead of protective gas, a current of air may be blown into the tower to regulate the temperature of the particles. The metal particles falling on to the bottom 14 slip in the direction of an outlet aperture 18, and drop from there on to a shaking trough or channel 19, which is surrounded by a heatable hood 20, to equalise the temperature of the metal particles. From the shaking trough 19, the metal particles, at a uniform temperature, pass into a feeding device 22, preceding a pair of rolls 21, of the horizontally arranged rolling mill W. The metal particles, compacted and welded together in the roll gap 24 of the rolls 21, leave the roll gap as a finished metal strip 25, which is supplied, over rollers 26 and a driver 27, to a reeling device 28. Between the driver 27 and the reel 28 is arranged a shear 29, for cropping or subdividing the strip as soon as it has been wound to the desired coil. In order to maintain the continuous rolling operation it is necessary, after the subdividing, to supply the strip 25', over rollers 26', to a second reeling plant, which is not shown, to enable it to be further reeled there. In the mean time, the already reeled coil is removed from the first reeling plant 28.

In the constructional example illustrated in FIG. 2, the metal particles likewise fall through the outlet aperture 18 on to the shaking trough 19, which is surrounded with a heatable hood 20 for equalising the temperature of the metal particles. From there they pass into the feeding device 22, which is constructed as a shaft, and has a lateral aperture 30. This aperture co-operates with a flap valve 31, or, according to FIG. 4, with a wedge 32, in such a way that when the flap valve or the wedge moves inwards, the current 33 of metal particles is wholly or partly deflected into the lateral aperture 30 of the feeding device 22. The current of particles 34 branched off in this way is removed from the neighbourhood of the rolling mill by way of a by-pass channel 35.

This arrangement ensures that even in the case of a brief interruption in the operation of the rolling mill, for the maintenance of a constant temperature and flow-through behaviour of the stock to be rolled, by the actuation of by-pass device the metal particles can take a different path. At the same time, the flow of metal particles to the rolling mill can be regulated. This is requisite, for instance, when the output of the apparatus for the production of the metal particles can not be accommodated by the succeeding treatment machine.

In addition to the above, the shaking trough 19 may have an adjustable construction to enable regulation in advance the charging of the feeding device 22. Furthermore, flow of metal particles 34 deflected by the by-pass device may be re-delivered, in a manner not further illustrated in the drawing, to the conically tapering bottom 14 according to FIG. 1.

A further embodiment for controlling the feed rate of the particles is illustrated in FIG. 3. Apart from the adjustable shaking trough 19 already mentioned, a regulating strip weigher 36 is employed, this balance co-operates with the shaking trough 19. The shaking trough 19 serves in this case exclusively for the charging of the treatment machine that follows it. The regulating strip weigher 36 consists of a conveyor belt 37, which passes around two reversing pulleys 38 and 39. Between two supporting rollers 40 is arranged a roller 42, co-operating with a balance 41. The roller 42 is loaded with the weight of the particle streams between the two supporting rollers 40, and this weight is continuously determined by the balance 41 and delivered to a regulator 43. At the same time the speed of the belt or strip, continuously determined by a measuring roller 44, is delivered to the regulator. Since the weight of the particle stream relates to the measured distance between the two supporting rollers, the product of the measurement by the balance 41 and the speed or distance to the measuring roller 44 yields the weight per unit of time, which is to be kept constant, and is given to the regulator as a desired value S. If the measured actual value does not agree with the desired value S, the speed of the conveyor belt 37 is suitably modified, by appropriately regulating the speed of revolution of the driving motor for the conveyor belt. The regulating lead leading from the regulator to the drive is marked A.

The by-pass device of FIGS. 2 and 4, already described, is primarily suitable for metal particles to be treated at a comparatively low temperature. Under these conditions the deflecting members, such as flap valves or wedges for example, can be very precisely fitted into the feeding device 22. In the case of higher treatment temperatures, however, such as are adopted with iron particles for example, an exact adaptation is no longer ensured to the requisite extent, and in this case it is a further disadvantage that metal particles may choke the gap of the flap valve or slide valve and of the feeding device 22.

According to a further feature of this invention, therefore, a device is provided for regulating and deflecting the metal particles, the functioning of this device being independent of precision fitting. This is attained by constructing the deflecting member as a rockable or slidable deflecting funnel, into the upper aperture of which the transporting means opens, and the lower aperture of which can be brought into operative communication with the inlet for the treatment machine and/or a deflecting channel, by rocking or sliding the deflecting funnel. The region between the end of the transporting means facing the deflecting funnel and the entry for the treatment machine, and also the defletcing channel, may advantageously be surrounded by heat-insulating walls.

The feeding device 22 disclosed in FIG. 5 is interrupted in its lower region, so that it terminates above a transversely displaceable deflecting funnel 45. The upper aperture 46 of the deflecting funnel 45 is of oval or oblong construction, so that the deflecting funnel can be displaced so far that its lower outlet aperture 47 passes out of the vicinity of the lower section 48 of the feeding device, and with its aperture assumes a position above a deflecting channel 49. By displacing the deflecting funnel by means of a rod 50, it can be brought into its second position, shown dotted. The rod 50 here projects through a fireproof wall 51. The deflecting funnel, on its long sides, has bearing surfaces 52, which bear upon correspondingly constructed bearing surfaces 53, as shown in FIG. 6. According to the position of the deflecting funnel, the flow of particles 33 is either passed entirely into the lower portion 48 of the feeding device 22, and there supplied to the rolls 21, which work up the particles into the finished product 25, or else only a part of it is supplied to the section 48, whilst the remainder is passed into the deflecting trough or channel 49, in order for instance to keep the height 54 of the particles above the roll gap 24 constant. In the event of a brief interruption of the rolling mill, the deflecting funnel is brought into the dotted-line position already mentioned, so that the flow of particles is passed completely into the deflecing channel. Hence there is no need to stop the apparatus for the production of the metal particles, and one can resume the operation immediately when the interruption at the rolling mill is removed.

With the construction illustrated in FIGS. 7 and 8, the deflecting funnel 45 is suspended by means of pivots 55 in the heat-resisting wall 51. By this means the upper aperture 46 of the deflecting funnel can be made smaller. In other respects the method of working is the same as in the case of the arrangement of the deflecting funnel shown in FIGS. 5 and 6.

We claim:

1. A method of producing metal strips directly from a metal melt without intermediate steps for raising the temperature comprising the steps of providing molten metal; subjecting said molten metal to an atomizing treatment to form molten droplets; permitting said droplets to freely fall in a current of cooling gas at least until said droplets solidify into particles, and controlling the cooling by said cooilng gas so that the temperature of said particles is at least that temperature necessary for sintering thereby precluding an intermediate heating step; and then compacting and sintering said particles into a continuous strip.

2. A method as claimed in claim 1 including the step of varying the quantity of said cooling gas employed to control the cooling effect thereof.

3. A method of claimed in claim 1 including the step of varying the temperature of said cooling gas employed to control the cooling effect thereof.

4. A method as claimed in claim 1 wherein said droplets and particles, from the production of the former through said compacting and sintering into said strip, are kept in an atmosphere of non-oxidizing gas.

5. A method as claimed in claim 1 wherein said compact and sintering of particles into said strip is carried out by a rolling operation.

6. A method as claimed in claim 1 wherein said cooling gas is non-oxidizing.

7. A method as claimed in claim 1 comprising the further step of subjecting said particles to a constant temperature so that the temperatures of the core and peripheral zone of said particles approach each other and thereby equalize the temperature of said particles before said compacting.

8. The method as claimed in claim 1 wherein the quantity of said particles approximately corresponds to the quantity of particles required for said compacting and sintering step, accurate corresponding being assumed by the further step of controlling the quantity of particles subjected to said compacting and sintering step.

9. A method as claimed in claim 8 wherein said controlling comprises passing said produced quantity of particles over a regulating weigher conveyor and controlling the speed of said conveyor dependent upon a predetermined weight per unit time ratio.

10. A method as claimed in claim 1 wherein said metal is selected from a group consisting essentially of aluminium, steel, copper, or alloys thereof.

11. A method as claimed in claim 6, wherein said gas is a reducing gas.

References Cited

UNITED STATES PATENTS

| | | |
|---|---|---|
| 1,938,876 | 12/1933 | Takata. |
| 2,371,105 | 3/1945 | Lepsoe. |
| 2,889,874 | 6/1959 | Gauvin. |
| 3,246,982 | 4/1966 | Moritz _____ 75—213 |
| 3,325,279 | 6/1967 | Lawrence _____ 75—213 XR |
| 3,328,166 | 6/1967 | Ayers _____ 75—213 XR |
| 3,334,408 | 8/1967 | Ayers _____ 75—211 XR |
| 3,359,100 | 12/1967 | Claus _____ 75—214 |

FOREIGN PATENTS 1,214,070  1959  France.

OTHER REFERENCES

Chemical Engineering Progress, vol. 46, No. 10, October 1950, pp. 501–508.

LELAND A. SEBASTIAN, Primary Examiner

A. J. STEINER, Assistant Examiner

U.S. Cl. X.R.

75—5, 211, 226